United States Patent Office 3,086,007
Patented Apr. 16, 1963

3,086,007
WATER SOLUBLE CELLULOSE ACETATE PROPIONATE SULFATE SALTS AND FILMS THEREOF
George P. Touey and John E. Kiefer, Kingsport, Tenn., assignors to Eastman Kodak Company, Rochester, N.Y., a corporation of New Jersey
No Drawing. Filed Aug. 1, 1961, Ser. No. 128,381
8 Claims. (Cl. 260—215)

This invention relates to a water soluble, anhydrous solvent soluble film-forming polymer, namely the alkali metal salt of cellulose acetate propionate sulfate having a composition of certain prescribed proportions and the water soluble films prepared therefrom.

The salts of cellulose acylate sulfates are known in the prior art. For instance, U.S. Patents Nos. 2,582,009 and 2,622,079 of Crane describe the water soluble salts of cellulose acetate sulfate. In the former patent the product is prepared by first reacting upon cellulose with a bath of acetic acid, acetic anhydride and sulfuric acid and when the cellulose is dissolved adding an alkali metal salt to neutralize the sulfate groups and precipitate the ester. U.S. Patent No. 2,622,079 describes reacting upon cellulose fibrously in a bath of acetic acid, acetic anhydride and alkali metal salt whereby the salts of the cellulose acetate sulfate are formed. The products thus obtained are water soluble and solutions thereof in water can be cast into water soluble films useful as packaging material for unit packages of powdered dyes, bleaches, detergents and the like such as might be used in household washing equipment. For instance, the unit package containing the desired material may be simply dropped into a washing machine at the start of a washing, bleaching or dyeing operation, thus eliminating weighing or touching the powder and therefore is both time-saving and less troublesome.

The alkali metal salts referred to are not soluble in volatile solvents such as alcohols, ketones or chlorinated hydrocarbons such as are commonly used to prepare cellulose ester films. Therefore those salts must be coated from water or water-miscible organic solvents containing substantial amounts of water which adds to the difficulties of evaporating the solvent due to high heat of vaporization of water. Solvent systems containing water are prone to produce tacky films which are difficult to process on commercial film casting equipment. The economic feasibility of coating out film depends on the speed at which the film can be coated. In preparing film it is ordinarily desirable to avoid the presence of water in the coating composition.

A disadvantage of films prepared from salts of cellulose acetate sulfate is their brittleness. Again, films prepared thereby are not readily susceptible to heat-sealing by ordinary techniques, thus limiting their use as a packaging material. Films of the salts of the cellulose esters containing sulfate radicals when plasticized may be used for some ordinary conditions, but low relative humidity may result in brittleness.

The sulfate salts of the simple cellulose esters seem to have various disadvantages which leave some things to be desired. For instance, although the sodium salt of cellulose propionate sulfate has many good characteristics, films prepared therefrom dissolve very slowly in water and therefore that material leaves something to be desired for use as a packaging material for unit packages.

One object of our invention is to provide a mixed ester of cellulose containing acetyl, propionyl and sodium sulfate groups within certain prescribed proportions. Another object of our invention is to provide an alkali metal salt of cellulose acetate propionate sulfate which is completely soluble both in water and in anhydrous volatile organic salts such as methylene chloride, methanol and the like. A still further object of our invention is to provide a film which is readily water soluble, is heat-sealable and exhibits flexibility under a wide range of humidity conditions. Other objects of our invention will appear herein.

We have found that alkali metal salts of cellulose acetate propionate sulfates having certain prescribed proportions are soluble in volatile organic solvents such as methanol and mixtures of methylene chloride and methanol so as to give transparent films which are easily soluble in water in use. Such films are also characterized by being heat-sealable and flexible at ordinary humidities such as those in excess of 15% R.H. Sheeting from these materials may be plasticized with a small amount (5–30%) of a polyethylene glycol or a polyol such as glycerol or diglycerol so as to give flexibility at relative humidity of 2% or less. We have found that the salts of cellulose acetate propionate sulfates have the prescribed characteristics in contrast with water soluble cellulose esters as have been described in the prior art. These cellulose acetate propionate sulfates have per $C_6$ unit of cellulose, 0–0.8 free and unesterified hydroxyl groups, 0.3–0.7 sulfate groups, 0.4–1.6 acetyl groups and 0.5–1.8 propionyl groups, the total of these four groups being 3. These esters are completely soluble in water and also soluble in anhydrous volatile organic solvents such as methanol, ethanol, methylene chloride, ethylene dichloride, acetone, chloroform, or mixtures of these solvents. By reason of the relative proportions of these groups a product is obtained which may be readily coated out from volatile solvents to form films which are not tacky and of good characteristics.

The objects of the invention are accomplished by reacting one part of cellulose in an esterification bath consisting of 2.5–6 parts of acetic anhydride, 2.5–10 parts of propionic acid, 0.1–0.5 part of sodium sulfate and 0.1–0.7 part of sulfuric acid, the sulfuric acid being used in molar excess of the sodium sulfate, at least 0.3 mol of sulfate groups per $C_6$ unit of cellulose being supplied by the reaction mixture. After mixing the mass at approximately 20–40° C. such as for ½ to 4 hours the excess sulfuric acid is neutralized with an alkali metal neutralizing agent such as sodium acetate and the product is washed free of acetic acid with 87% isopropanol. These esters are susceptible to dissolving in volatile organic solvents. By casting this solution on a film-forming surface, e.g. chrome-plated surface such as with the use of a doctor blade, a clear, flexible, heat-sealable film is obtained.

The following examples illustrate the preparation of cellulose derivatives:

*Example 1*

162 parts of wood pulp and 486 parts of propionic acid were fed to a sigma blade mixer cooled to 14° C. A sulfating mixture consisting of 395 parts of propionic acid, 61 parts of sulfuric acid and 377 parts of acetic anhydride was then added over a 30-minute period. The addition of the sulfating mixture with slow stirring caused the reaction temperature to rise to 30° C. The mass was cooled to 20° C. and mixed at that temperature for 2 hours until a smooth opaque dope was obtained. There was then added 50 parts of sodium acetate and the mixing was continued for an hour. The sodium cellulose acetate propionate sulfate formed was precipitated into isopropanol. This precipitate was washed free of excess acid and was dried at 50° C. Analysis of this product showed that it contained 5.1% combined sulfur, 15% of acetyl and 18% of propionyl, corresponding to about 0.5 sodium sulfate groups, 1.1 acetyl groups and 1.0 propionyl groups per $C_6$ unit of cellulose. 30 parts of the ester were dissolved in a mixture of 35 parts of methylene chloride and 35 parts of methanol giving a clear viscous solution. This solution was poured onto a smooth chrome-plated film-forming surface and spread into a smooth film by means of a doctor blade adjusted to give a thickness of 0.002″ of the dry film. After 1½ minutes the film was a solid gel and in this form was stripped from the film-forming surface and dried. It was clear, flexible and readily soluble in water.

Example 2

30 parts of the ester prepared by the method described in the preceding example were dissolved in a mixture consisting of 35 parts of methylene chloride and 35 parts of methanol. 5 parts of polyethylene glycol (molecular weight 300) was dissolved therein and the solution was cast into a film by the procedure described in the preceding example. The film obtained was both clear and flexible and was readily soluble in water. A portion of the film was stored for one week in a desiccator over calcium chloride. The film thus treated retained its flexibility. In this example polyethylene glycol was employed as a plasticizer. However, in compositions in accordance with our invention other plasticizers than the polyethylene glycols, such as glycerol, diglycerol, sucrose, sorbitol or other polyols, may be incorporated in a proportion of 5-30% based on the weight of the cellulose ester and the films resulting are heat-sealable and are more tear resistant than films resulting from compositions in which plasticizer had not been used. The films in accordance with our invention, either plasticized or unplasticized, do not exhibit brittleness at low R.H. even when extremely low. Due to their being readily soluble in water, these films are ideally suitable for packing material for unit packages, such as dyes, detergents, insecticides, or the like.

Example 3

162 parts of cotton linters and 486 parts of propionic acid were placed in a sigma blade mixer and cooled to 17° C. There was added over a period of 30 minutes while running the mixer a sulfating mixture consisting of 395 parts of propionic acid, 51 parts of sulfuric acid, 300 parts of acetic anhydride, 200 parts of propionic anhydride and 35 parts of sodium acetate. During this addition the reaction mass temperature rose to 30° C. The mass was then mixed at 30° C. until a smooth dope was obtained at the end of 3½ hours. 10 parts of sodium acetate were added and mixing was continued for an additional hour. The sodium cellulose acetate propionate sulfate thus obtained was precipitated into isopropanol. The precipitate was washed free of excess acid and was dried at 50° C. It contained 4.5% combined sulfur, 6.7% acetyl, and 30% propionyl, corresponding to an average degree of substitution of 0.45 sodium sulfate groups, 0.5 acetyl groups and 1.7 propionyl groups per $C_6$ unit of cellulose. The product obtained was soluble in water, methanol, methylene chloride-methanol (1:1) and methanol-acetone (3:1). The solutions obtained with the various volatile solvents may be coated out to form a transparent water soluble film for any use where a water soluble film is desirable.

Example 4

A series of sodium salts of cellulose sulfates containing fatty acid groups were prepared by modifications of the method described in Example 1. The solubility of each of the esters in a 50/50 mixture of methylene chloride-methanol was determined. The samples, which were completely soluble, were converted into plasticized films by the method described in Example 2. Two 3-inch square unit packages were made from each film and each package was filled with a commercial powdered detergent, whereupon the package was heat-sealed with an impulse-type heat sealer. One package of each type of film was stored in a desiccator over calcium chloride for 24 hours then removed and immediately dropped on a concrete floor from a height of 4 feet. Packages not conditioned at low relative humidity were put into an apartment-sized washing machine containing water and operating at 140° F. The time required for the package to release its contents and the time required for the package to completely dissolve were observed. The results of the drop test, the acetyl-propionyl relationships in the various samples, and the rate of solution of the packages thereof are recorded in the following table:

| Sample No. | Degree of Substitution Per Anhydroglucose Unit | | | Drop Test at Low R. H. | Dissolving Time (Min.) in Washing Machine | | Remarks |
|---|---|---|---|---|---|---|---|
| | Sulfur | Acetyl | Propionyl | | Released Contents | Completely Dissolved | |
| 1 | 0.48 | 2.1 | 0 | | | | Insoluble in casting solvent. |
| 2 | 0.53 | 1.8 | 0.3 | Broke | 0.4 | 2.6 | |
| 3 | 0.54 | 1.4 | 0.6 | Did not break | 0.6 | 3.9 | Poor solubility in casting solvent. |
| 4 | 0.50 | 1.1 | 1.0 | do | 0.7 | 3.5 | |
| 5 | 0.47 | 0.7 | 1.4 | do | 0.6 | 4.0 | |
| 6 | 0.51 | 0.2 | 2.0 | do | 3.1 | 28.4 | |
| 7 | 0.44 | 0 | 2.3 | do | 8.2 | >60.0 | |

We claim:

1. A water soluble cellulose acetate propionate alkali metal sulfate having the formula:

$(C_6H_7O_2)(OSO_3M)_a(OCOCH_3)_b(OCOCH_2CH_3)_c(OH)_d$ in which $a=0.3$ to 0.7, $b=0.4$ to 1.6, $c=0.5$ to 1.8, $d=0$ to 0.8 ($C_6H_7O_2$) represents an anhydroglucose unit of cellulose less 3 hydroxyl units, and M is an alkali metal substituent.

2. A water soluble cellulose acetate propionate sodium salt having the formula:

$(C_6H_7O_2)(OSO_3Na)_a(OCOCH_3)_b(OCOCH_2CH_3)_c(OH)_d$ in which $a=0.3$ to 0.7, $b=0.4$ to 1.6, $c=1.5$ to 1.8, $d=0$ to 0.8 and ($C_6H_7O_2$) represents an anhydroglucose unit of cellulose less 3 hydroxyl units.

3. A water soluble sodium cellulose acetate propionate sulfate having an average degree of substitution of 0.5 sodium sulfate groups, 1.1 acetyl groups and 1.0 propionyl groups per anhydroglucose unit.

4. A water soluble sodium cellulose acetate propionate sulfate having an average degree of substitution of 0.45 sodium sulfate groups, 0.5 acetyl groups and 1.7 propionyl groups per anhydroglucose unit.

5. A method of preparing a water soluble salt of cellulose acetate propionate sulfate which comprises reacting upon 1 part of cellulose with an esterification bath essentially consisting of 2.5 to 6.0 parts of acetic anhydride, 2.5 to 10.0 parts of propionic acid, 0.1 to 0.5 part of sodium sulfate and 0.1 to 0.7 part of sulfuric acid, the sulfuric acid being in molar excess of the sodium sulfate with at least 0.3 mol of sulfate groups per mol of cellulose present in the reaction mixture.

6. A method of preparing a water soluble salt of cellulose acetate propionate sulfate which comprises reacting upon approximately 162 parts of cellulose with an esterification bath essentially consisting of approximately 881 parts of propionic acid, 61 parts of sulfuric acid, 377 parts of acetic anhydride and 50 parts of sodium acetate until the cellulose has dissolved in the mass to form a dope of sodium cellulose acetate sulfate.

7. A method of preparing a water soluble salt of cellulose acetate propionate sulfate which comprises reacting upon approximately 162 parts of cellulose with an esterification bath essentially consisting of approximately 395 parts of propionic acid, 51 parts of sulfuric acid, 300 parts of acetic anhydride, 200 parts of propionic anhydride and 35 parts of sodium acetate.

8. A transparent water soluble film essentially consisting of a sodium cellulse acetate propionate sulfate having an average degree of substitution of 0.5 sodium sulfate groups, 1.1 acetyl groups and 1.0 propionyl groups per anhydroglucose unit.

References Cited in the file of this patent

UNITED STATES PATENTS

| | | |
|---|---|---|
| 2,016,299 | Schulze | Oct. 8, 1935 |
| 2,862,922 | Sparrow et al. | Dec. 2, 1958 |
| 2,969,356 | Touey et al. | Jan. 24, 1961 |
| 3,000,876 | Touey et al. | Sept. 19, 1961 |
| 3,008,952 | Touey et al. | Nov. 14, 1961 |